United States Patent
Yang

(10) Patent No.: US 12,382,436 B2
(45) Date of Patent: Aug. 5, 2025

(54) COMMUNICATION METHOD AND APPARATUS, AND DEVICE

(71) Applicant: GUANGDONG OPPO MOBILE TELECOMMUNICATIONS CORP., LTD., Guangdong (CN)

(72) Inventor: Ning Yang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 673 days.

(21) Appl. No.: 17/748,488

(22) Filed: May 19, 2022

(65) Prior Publication Data
US 2022/0304068 A1    Sep. 22, 2022

Related U.S. Application Data

(63) Continuation of application No. PCT/CN2019/122040, filed on Nov. 29, 2019.

(51) Int. Cl.
| | |
|---|---|
| H04W 74/08 | (2024.01) |
| H04W 72/04 | (2023.01) |
| H04W 72/044 | (2023.01) |
| H04W 72/51 | (2023.01) |
| H04W 74/0833 | (2024.01) |

(52) U.S. Cl.
CPC ..... *H04W 74/0833* (2013.01); *H04W 72/044* (2013.01); *H04W 72/51* (2023.01)

(58) Field of Classification Search
None
See application file for complete search history.

(56) References Cited

U.S. PATENT DOCUMENTS

| | | | |
|---|---|---|---|
| 2017/0041916 A1 | 2/2017 | Soret et al. | |
| 2021/0084680 A1* | 3/2021 | Lei | .......... H04L 5/0051 |
| 2021/0392703 A1* | 12/2021 | Xu | .......... H04W 74/0841 |
| 2022/0015154 A1* | 1/2022 | Wu | .......... H04L 5/0048 |

(Continued)

FOREIGN PATENT DOCUMENTS

| | | |
|---|---|---|
| CN | 108307506 A | 7/2018 |
| CN | 108633050 A | 10/2018 |

(Continued)

OTHER PUBLICATIONS

The Search Report of corresponding European application No. 19953812.5, dated Aug. 2, 2022.

(Continued)

*Primary Examiner* — Steve R Young
(74) *Attorney, Agent, or Firm* — Ladas & Parry LLP

(57) ABSTRACT

Embodiments of the present application provide a communication method and apparatus, and a device. The method includes: a terminal device receives network configuration information sent by the network device for acquiring a network device, wherein, the network configuration information includes multiple random access configurations, and time domain resources indicated by the multiple random access configurations are different; and the terminal device selects a specified random access configuration from the multiple random access configurations according to positioning capability of the terminal device to perform random access. RACH capacity is increased.

20 Claims, 9 Drawing Sheets

(56) References Cited

U.S. PATENT DOCUMENTS

2022/0104274 A1\* 3/2022 Xu .................. H04L 5/0069
2022/0124826 A1\* 4/2022 You ................ H04W 74/0833

FOREIGN PATENT DOCUMENTS

| CN | 110300455 A | 10/2019 |
|---|---|---|
| EP | 3972325 A1 | 3/2022 |
| WO | 2019086309 A1 | 5/2019 |
| WO | 2020198671 A1 | 10/2020 |

OTHER PUBLICATIONS

Oppo, Left issues on random access procedure in NTN, R2-1913335, 3GPP TSG-RAN WG2 Meeting #107bis, Chongqing, China, Oct. 14-Oct. 18, 2019.

Huawei, HiSilicon, RACH resource configuration and utilization in NTN, R2-1913786, 3GPP TSG-RAN WG2 Meeting 107Bis, Chongqing, China, Oct. 14-18, 2019.

International Search Report (ISR) dated Aug. 26, 2020 for Application No. PCT/CN2019/122040.

Huawei, HiSilicon:'RACH resource configuration and utilization in NTN' 3GPP TSG-RAN WG2 Meeting#108 R2-1916116 Nov. 8, 2019.

\* cited by examiner

COMMUNICATION METHOD AND APPARATUS, AND DEVICE

CROSS-REFERENCE TO RELATED APPLICATION

This application is a continuation of International Application No. PCT/CN2019/122040, filed on Nov. 29, 2019, which is hereby incorporated by reference in its entirety.

TECHNICAL FIELD

Embodiments of the present application relate to the field of communication technologies, and in particular, to a communication method and apparatus, and a device.

BACKGROUND

A non-terrestrial network (NTN) refers to a communication network between a terminal device and a satellite (which may also be called a network device).

At present, a terminal device may be a terminal device with or without positioning capability. A network device usually configures same random access channel (RACH) resources for all terminal devices so that terminal devices perform random access according to the RACH resources. In order to enable a terminal device without positioning capability to successfully access the network device, in the RACH resources configured for terminal devices, a time interval between adjacent time domain resources needs to be larger than a length of a RACH receiving window of the network device, resulting in small RACH capacity of the RACH resources configured for the terminal devices.

SUMMARY

Embodiments of the present application provide a communication method and apparatus, and a device. RACH capacity is increased.

In a first aspect, an embodiment of the present application provides a communication method, and the method includes:

acquiring, by a terminal device, multiple random access configurations of a network device, where the multiple random access configurations indicate different time domain resources; and selecting, by the terminal device, according to positioning capability thereof, a random access configuration from the multiple random access configurations to perform random access.

In a second aspect, an embodiment of the present application provides a communication method, and the method includes:

generating, by a network device, multiple random access configurations, where the multiple random access configurations indicate different time domain resources; and sending, by the network device, the multiple random access configurations to a terminal device, where the multiple random access configurations are used for terminal devices with different positioning capability to perform random access.

In a third aspect, an embodiment of the present application provides a communication apparatus, which is applied to a terminal device, and the apparatus includes a receiving module and a processing module, where, the receiving module is configured to acquire multiple random access configurations of a network device, and the multiple random access configurations indicate different time domain resources; and the processing module is configured to select, according to positioning capability thereof, a random access configuration from the multiple random access configurations to perform random access.

In a fourth aspect, an embodiment of the present application provides a communication apparatus, which is applied to a network device, and the apparatus includes a processing module and a sending module, where, the processing module is configured to generate multiple random access configurations, and the multiple random access configurations indicate different time domain resources; and the sending module is configured to send the multiple random access configurations to a terminal device, and the multiple random access configurations are used for terminal devices with different positioning capability to perform random access.

In a fifth aspect, an embodiment of the present application provides a terminal device, including: a transceiver, a processor and a memory;

the memory stores computer-executable instructions; and the processor executes the computer-executable instructions stored in the memory to cause the processor to execute the communication method according to any one of the first aspect.

In a sixth aspect, an embodiment of the present application provides a network device, including: a transceiver, a processor and a memory;

the memory stores computer-executable instructions; and the processor executes computer-executable instructions stored in the memory to cause the processor to perform the communication method according to any one of the second aspect.

In a seventh aspect, an embodiment of the present application provides a computer readable storage medium, where the computer readable storage medium has computer-executable instructions stored thereon, and the computer executable-instructions, when executed by a processor, are used to implement the communication method according to any one of the first aspect.

In an eighth aspect, an embodiment of the present application provides a computer readable storage medium, where the computer readable storage medium has computer-executable instructions stored thereon, and the computer executable-instructions, when executed by a processor, are used to implement the communication method according to any one of the second aspect.

Embodiments of the present application provides a communication method and apparatus, and a device, a network device generates and sends multiple random access configurations to a terminal device, and the terminal device can selects a random access configurations from the multiple random access configurations according to positioning capability thereof to perform random access. For a terminal device that does not have positioning capability or that has positioning capability but fails in positioning, random access configuration information indicating fewer time domain resources may be selected for performing random access, so that a problem that the network device cannot determine an initial TA of the terminal device can be avoided. For a terminal device that has the positioning capability and succeeds in positioning, a random access configuration indicating more time domain resources may be selected for performing random access, so that the terminal device can have more time domain resources for performing random access and the RACH capacity is increased.

DESCRIPTION OF EMBODIMENTS

Figure 1:
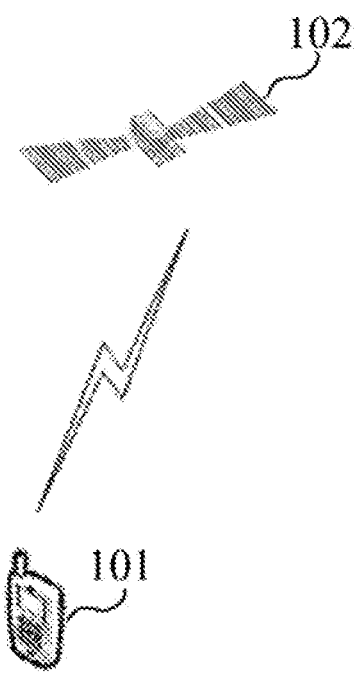
FIG. 1 is a schematic architectural diagram of a communication system provided by an embodiment of the present application.

For ease of understanding, first of all, concepts related to the present application are described.

Terminal device: usually with a wireless transceiving function, and a terminal device may be deployed on land, including indoor or outdoor, handheld, wearable, or vehicle-mounted; and it may also be deployed on a water surface (such as on a ship); and it may also be deployed in air (for example, on an aircraft, a balloon, a satellite, etc.). The terminal device may be a mobile phone, a pad, a computer with a wireless transceiving function, a virtual reality (referred to as VR) terminal device, an augmented reality (referred to as AR) terminal device, a wireless terminal device in industrial control, a vehicle-mounted terminal device, a wireless terminal device in self driving (self driving), a wireless terminal device in remote medical, a wireless terminal device in smart grid, a wireless terminal device in transportation safety, a wireless terminal device in smart city, a wireless terminal device in smart home, and a wearable terminal device, etc. The terminal device involved in embodiments of the present application may also be referred to as a terminal or a user equipment (UE), an access terminal device, a vehicle-mounted terminal, an industrial control terminal, a UE unit, a UE station, a mobile station, a mobile platform, a remote station, a remote terminal device, a mobile device, a UE terminal device, a wireless communication device, a UE agent or a UE apparatus, etc. The terminal device may also be fixed or mobile.

Network device: usually with a wireless transceiving function, and a network device may have a mobile feature. For example, the network device may be a mobile device. In an embodiment, the network device may be a satellite, a balloon station. For example, a satellite may be a low earth orbit (LEO) satellite, a medium earth orbit (MEO) satellite, a geostationary earth orbit (GEO) satellite, a high octagonal orbit (HEO) satellite, etc. For example, an orbital altitude range of the LEO satellite is usually 500 km to 1500 km, and an orbital period (a period of rotation around the Earth) is about 1.5 hours to 2 hours. A signal propagation delay of a single-hop communication between users is about 20 ms, and a single-hop communication delay between users refers to a transmission delay between a terminal device and a network device or a delay between a network device and a transmission device. A maximum satellite viewing time is about 20 minutes, and the maximum viewing time refers to a longest time that a satellite beam covers a certain area on the ground. The LEO satellite moves relative to the ground, and as the satellite moves, an area of the ground it covers changes. The LEO satellite has a short signal propagation distance, less link loss, and low requirements on the transmitting power of the terminal device. An orbit altitude of the GEO satellite is usually 35,786 km, and an orbital period is 24 hours. A signal propagation delay of a single-hop communication between users is about 250 ms. In order to ensure coverage of the satellite and improve system capacity of a communication network, the satellite may use multiple beams to cover the ground. For example, a satellite may form dozens or hundreds of beams to cover the ground, and a beam can cover a ground area of a diameter of dozens to hundreds of kilometers. Of course, the network device may also be a base station provided on land or in a water area. For example, the network device may be a next generation NodeB (gNB) or a next generation-evolved NodeB (ng-eNB), where the gNB provides UEs with user plane functions and control plane functions of new radio (NR), and the ng-eNB provides UEs with user plane functions and control plane functions of evolved universal terrestrial radio access (E-UTRA). It should be noted that the gNB and ng-eNB are only names and are used for base stations that support a 5G network system but do not have restrictive significance. The network device may also be a base station (BTS) in a GSM system or a CDMA system, and may also be a base station (nodeB, NB) in a WCDMA system, and may also be an evolutional nodeB (eNB or eNodeB) in an LTE system. Or, the network device may be a relay station, an access point, a vehicle-mounted device, a wearable device, a network side device in a network after the 5G or a network device in a future evolution of a public land mobile network (PLMN), a road site unit (RSU), etc.

Architecture of a communication system in the present application is described in combination with FIG. 1 and FIG. 2 in the following.

FIG. 1 is a schematic architectural diagram of a communication system provided by an embodiment of the present application. Referring to FIG. 1, which includes a terminal device 101 and a satellite 102, wireless communication can be performed between the terminal device 101 and the satellite 102. A network formed between the terminal device 101 and the satellite 102 may also be called an NTN. In the architecture of the communication system shown in FIG. 1, the satellite 102 has a function of a base station, and the terminal device 101 and the satellite 102 can communicate directly with each other.

Figure 2:
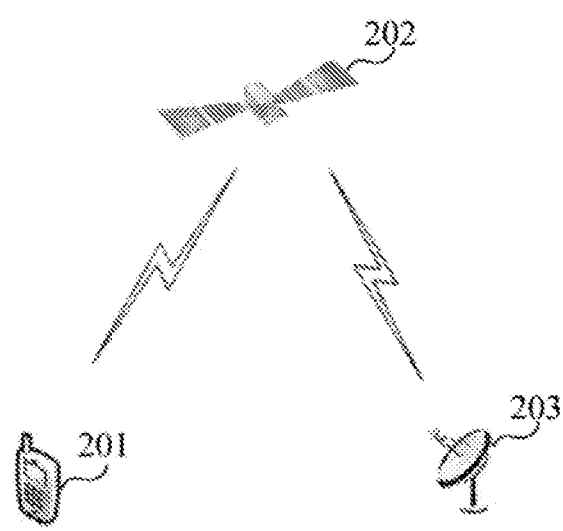
FIG. 2 is a schematic architectural diagram of another communication system provided by an embodiment of the present application.

FIG. 2 is a schematic architectural diagram of another communication system provided by an embodiment of the present application. Referring to FIG. 2, which includes a terminal device 201, a satellite 202 and a base station 203, wireless communication can be performed between the terminal device 201 and the satellite 202, and communication can be performed between the satellite 202 and the base station 203. A network formed among the terminal device 201, the satellite 202 and the base station 203 may also be called an NTN. In the architecture of the communication system shown in FIG. 2, the satellite 202 does not have a function of a base station, and the communication between the terminal device 101 and the base station 203 needs to be relayed through the satellite 202.

In a communication process, a network device (for example, the satellite 102 in FIG. 1 or the base station 203 in FIG. 2) may generate a RACH configuration (also known as a random access configuration), and a terminal device may access the network device through a random access process according to the RACH configuration generated by the network device.

The random access configuration includes the following information:

a frequency domain resource configuration, or indication information indicating the frequency domain resource configuration;

a time domain resource configuration; and a random access preamble configuration, or indication information indicating the random access preamble configuration.

The frequency domain resource configuration may also be called a RACH frequency domain resource configuration. The frequency domain resource configuration may be used to indicate RACH frequency domain resources. For example, the frequency domain resource configuration may include a RACH start frequency domain resource index and a quantity of RACH resources that can be frequency-division multiplexed at the same time (that is, the quantity of consecutive RACH frequency domain resources). The RACH frequency domain resources indicated by the frequency domain resource configuration are a segment of consecutive frequency domain resources.

The time domain resource configuration may also be called a RACH time domain resource configuration. The time domain resource configuration may be used to indicate RACH time domain resources. For example, a RACH configuration index may be used to indicate a time domain resource configuration, and a RACH resource repetition period, a quantity of RACH Occasions (ROs) included in the RACH resource repetition period, a duration of each RO, etc., may be known through the RACH configuration index. The ROs correspond to time domain resources, for example, one RACH time domain resource corresponds to one RO.

The random access preamble configuration may include a preamble root sequence, so that after a terminal device receives the preamble root sequence, the terminal device can perform cyclic shift on the preamble root sequence to obtain a preamble group. At least one preamble is included in the preamble group. Or, a preamble group may also be included in the random access preamble configuration, and at least one preamble is included in the preamble group.

In an actual application process, a terminal device may initiate random access in multiple possible scenarios. For example, the multiple possible scenarios may include at least one of the following scenarios: (1) after a state of the terminal device switches from a radio resource control (RRC) idle state to an RRC connected state, the terminal device initiates random access in a radio link establishment process with a network device. (2) After a radio link between the terminal device and the network device fails, when the terminal device initiates random access when re-establishing an RRC connection with the network device. (3) When the terminal device needs to establish uplink synchronization with a new cell, random access is initiated. (4) When the terminal device is in an RRC connected state and the uplink is out of synchronization, then random access will be initiated if uplink or downlink data arrives. (5) When the terminal device is in an RRC connected state, but a dedicated resource for sending a scheduling request has not been configured on a physical uplink control channel (PUCCH) for the terminal device, random access is initiated. (6) When a scheduling request fails, random access is initiated. (7) In a case of an RRC request in synchronization reconfiguration, random access is initiated. (8) When a state of the terminal device is switched from an RRC inactive state to an RRC connected state, random access is initiated. (9) When time alignment is established during addition of a second cell, random access is initiated. (10) When other system information than a master information block (MIB) and a system information block (SIB) is requested, random access is initiated. (11) During beam failure recovery, random access is initiated.

The random access involved in the embodiments of the present application may include four-step random access (also known as four-step random access channel, or referred to as 4-step RACH) and two-step random access (also known as two-step random access channel, or referred to as 2-step RACH). For ease of understanding, the processes of 4-step RACH and 2-step RACH are described in detail below.

Figure 3:
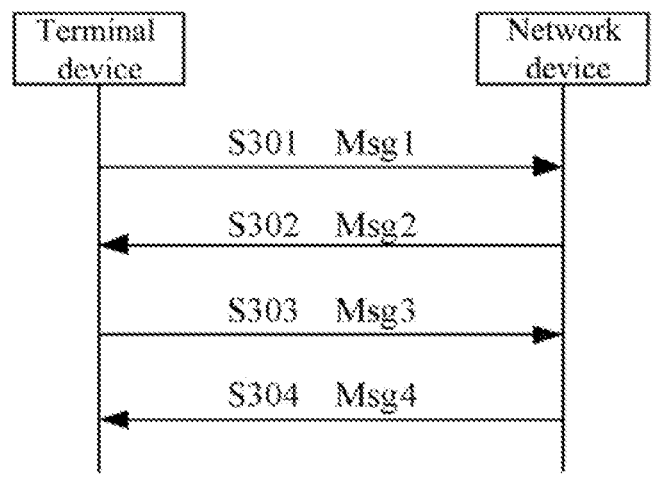
FIG. 3 is a schematic flowchart of 4-step RACH provided by an embodiment of the present application.

FIG. 3 is a schematic flowchart of 4-step RACH provided by an embodiment of the present application. The 4-step RACH is defined in detail in the existing protocol TS38.300, and the present application only provide a simply description. Please referring to FIG. 3, the method may include:

S301, a terminal device sends a Msg1 to a network device.

The Msg1 may also be called msg1, or MSG1.

The Msg1 is used to transmit a random access preamble, and the random access preamble may also be called a random access preamble sequence, or a preamble, or a preamble sequence.

In the embodiment of the present application, the preamble and time-frequency resources occupied by sending the preamble are referred to as physical random access channel (PRACH) resources.

In an embodiment, the terminal device may select a PRACH resource, as well as a preamble, and send the selected preamble on the selected PRACH resource. If a mode of random access is non-contention based random access, then the base station may specify a PRACH resource and a preamble, and the base station may estimate a timing advance (TA) and the size of uplink grant required for the terminal device to transmit a Msg3 based on the preamble sent by the terminal device.

For example, the network device may broadcast available PRACH resources through a system message.

S302, the network device sends a Msg2 to the terminal device.

The Msg2 may also be called Msg2, or MSG2.

The Msg2 includes time-frequency resources that the network device determines for the terminal device to use to send a payload.

After the terminal device sends the Msg1, it may start a random access response window (ra-Response window), and monitor the ra-Response window for a physical downlink control channel (PDCCH) scrambled with a random access radio network temporary identifier (RA-RNT1).

The RA-RNT1 is related to PRACH time-frequency resources used by the terminal device to send the Msg1.

After the terminal device successfully receives the PDCCH scrambled by the RA-RNT1, the terminal device can obtain a physical downlink shared channel (PDSCH) scheduled by the PDCCH where a random access response (RAR) is included. The RAR may include the following information:

- a back-off indicator (B1) included in an RAR sub-header and used to indicate a back-off time for retransmitting Msg1;
- a RAPID in the RAR: a preamble index received by a network response;
- a timing advance group (TAG) included in a payload of the RAR and used to adjust uplink timing;
- uplink (UL) grant: an uplink resource indication used to schedule Msg3;
- temporary cell radio network temporary identifier C-RNT1): used to scramble PDCCH of Msg4.

If the terminal receives the RAR-RNT1-scrambled PDCCH, and the RAR includes the preamble index sent by itself, then the terminal considers that the random access response has been successfully received.

For non-contention based random access, after the terminal successfully receives the Msg2, the random access process ends. For contention based random access, after the terminal device successfully receives the Msg2, it is also necessary to continue to transmit a Msg3 and receive a Msg4.

S303, the terminal device sends a Msg3 to the network device.

The Msg3 may also be called msg3, or MSG3.

The Msg3 is a first scheduled transmission in the random access process, which sends a payload, for example, an RRC connection request message, a tracking area update message, etc.

The Msg3 may notify the network device of an event which triggered the RACH process. For example, if it is an initial access random process, a UE ID and an establishment cause will be carried in the Msg3; and if it is RRC reestablishment, a connected-state UE identification and an establishment cause will be carried.

It should be noted that if different terminal devices select a same preamble in S301 and send the preamble on a same time-frequency resource, then the different terminal devices send payloads on the same time-frequency resource, and thus resource usage conflict is caused.

S304, the network device sends a Msg4 to the terminal device.

The Msg4 may also be called Msg4, or MSG4.

The Msg4 is used to indicate whether the terminal device successfully accesses the network device.

The Msg4 may have the following two functions: one is to solve contention conflicts, while the other is that the network device transmits an RRC configuration message to the terminal device. There are two ways to solve the contention conflict: one is that if the terminal device carries a C-RNT1 in the Msg3, then the Msg4 is scheduled with a PDCCH scrambled by the C-RNT1. The other is that if the terminal device does not carry a C-RNT1 in the Msg3, for example, in an initial access, then the Msg4 is scheduled with a PDCCH scrambled by a TC-RNT1, and the conflict is solved by the terminal device receiving the PDSCH of the Msg4 and matching a service data unit (SDU) of a common control channel (CCCH) in the PDSCH.

Figure 4:
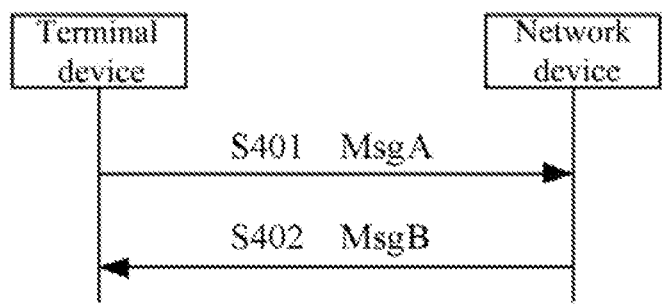
FIG. 4 is a schematic flowchart of 2-step RACH provided by an embodiment of the present application.

FIG. 4 is a schematic flowchart of 2-step RACH provided by an embodiment of the present application. Referring to FIG. 4, the method may include:

S401, a terminal device sends a MsgA to a network device.

The MsgA may also be called msgA, or MSGA.

The msgA includes a preamble and a payload (for example, an RRC connection request message, a tracking area update message, etc.).

S402, the network device sends a msgB to the terminal device.

The msgB may also be called MsgB or MSGB, which is used to indicate whether the terminal device successfully accesses the network device.

From the above random access processes, it can be seen that a main purpose of random access is to obtain uplink synchronization between the terminal device and the network device (cell). In a random access process, the network device determines a time when the terminal device sends the preamble according to a RACH time-frequency resource used to receive the preamble from the terminal device, so as to determine an initial TA of the terminal device according to a transmission time and reception time of the preamble, and notify the terminal device through the RAR.

Next, methods of determining the initial TA are described respectively.

The terminal device involved in the embodiment of the present application includes a terminal device with positioning capability and a terminal device without positioning capability. The two types of terminal devices determine the initial TA in different ways. The methods of determining the initial TA for the two types of terminal devices are described respectively below.

For a terminal device without positioning capability, when the architecture of the communication system is different, the terminal device without positioning capability determines the initial TA in a different manner. The method of determining the initial TA by the terminal device without positioning capability will be described below in combination with FIG. 5 and FIG. 6.

Figure 5:
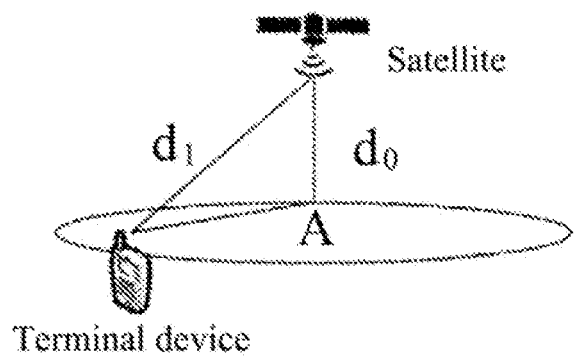
FIG. 5 is a schematic diagram for determining an initial TA provided by an embodiment of the present application.

FIG. 5 is a schematic diagram for determining an initial IA provided by an embodiment of the present application. Referring to FIG. 5, the architecture of the communication system is the same as FIG. 1, and the satellite has the function of a base station. The distance between the satellite and a perigee A is $d_0$. Within the coverage of the satellite, the distance between the satellite and the perigee A is the smallest.

In a process of practical application, the satellite (the network device) determines a public TA according to a signal transmission delay between the satellite and the perigee A, and broadcasts the public TA. In the random access process, the terminal device may send a preamble to the satellite according to the public TA. After the satellite receives the preamble, the satellite may determine a dedicated TA of the terminal device according to the distance $d_1$ between the satellite and the terminal device and send the dedicated TA to the terminal device. For example, the dedicated TA may be carried in an RAR sent to the terminal device. The terminal device determines the sum of the public TA and the dedicated TA as the initial TA, where the public TA is:

$$\frac{2 \times d_0}{c},$$

and the dedicated TA is:

$$\frac{2 \times (d_1 - d_0)}{c},$$

where c is the propagation speed of the signal.

Figure 6:
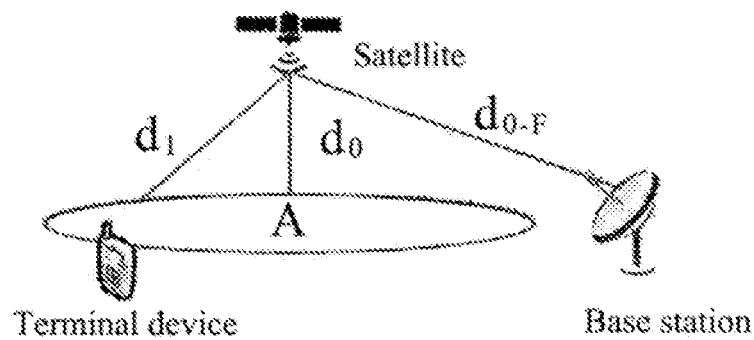
FIG. 6 is another schematic diagram for determining an initial TA provided by an embodiment of the present application.

FIG. 6 is another schematic diagram for determining an initial TA provided by an embodiment of the present application. Referring to FIG. 6, the architecture of the communication system is the same as FIG. 2, and the satellite does not have the function of a base station. The distance between the satellite and the perigee A is $d_0$. Within the coverage of the satellite, the distance between the satellite and the perigee A is the smallest. The distance between the satellite and the base station is $d_{0-F}$.

In a process of practical application, the base station (the network device) determines a public TA according to a transmission delay between the base station and the satellite and a signal transmission delay between the satellite and the perigee A, and broadcasts the public TA. In the random access process, the terminal device may send a preamble to the base station according to the public TA. After the base station receives the preamble, the base station may determine a dedicated TA of the terminal device according to the distance $d_1$ between the satellite and the terminal device and send the dedicated TA to the terminal device. For example, the dedicated TA may be carried in an RAR sent to the terminal device. The terminal device determines the sum of the public TA and the dedicated TA as the initial TA, where the public TA is:

$$\frac{2 \times (d_0 + d_{0-F})}{c},$$

and the dedicated TA is:

$$\frac{2 \times (d_1 - d_0)}{c},$$

where c is the propagation speed of the signal.

For a terminal device with positioning capability, the process of determining an initial TA of the terminal device is described below in combination with FIG. 7.

Figure 7:
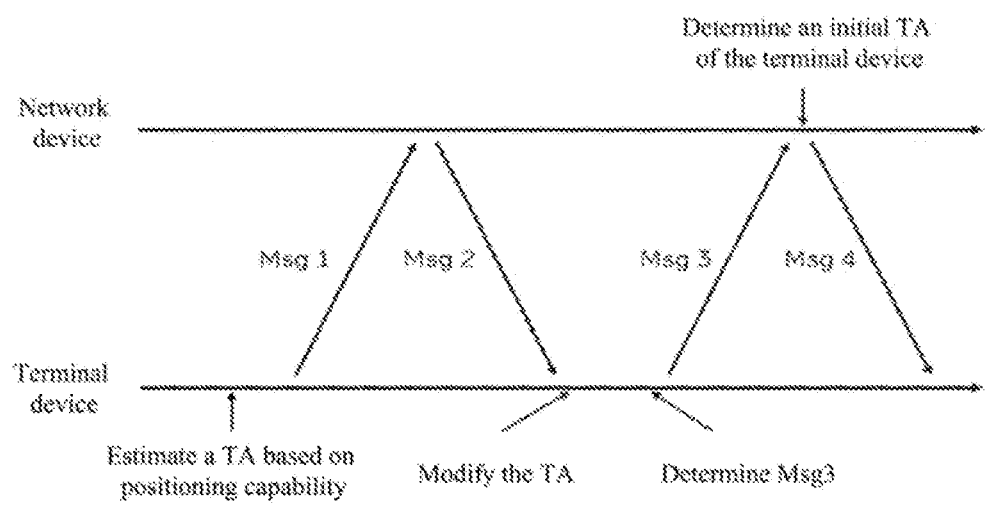
FIG. 7 is still another schematic diagram for determining an initial TA provided by an embodiment of the present application.

FIG. 7 is still another schematic diagram for determining an initial TA provided by an embodiment of the present application. Referring to FIG. 7, a terminal device estimates its own TA according to the positioning capability thereof and sends a Msg1 using its estimated TA. After receiving the Msg1, the network device determines a TA adjustment value of the terminal device and sends the TA adjustment value to the terminal device through a Msg2. Since the network does not know an exact TA value of the terminal device at this time, the network may schedule a resource for a Msg3 of the terminal device according to a maximum uplink scheduling delay. The terminal device adjusts the TA based on the received TA adjustment value and sends the Msg3 on the uplink resource scheduled by the network. After receiving the Msg3 sent by the terminal device, the network device may determine the initial TA used by the terminal device. Henceforth, the network device and the terminal device have the same understanding on the initial TA of the terminal device.

According to the method for determining the initial TA shown in above FIG. 5 to FIG. 7, for the terminal device without positioning capability, after the network device receives the preamble sent by the terminal device, the network device needs to know the random access channel occasion (RACH occasion, RO) on which the terminal device sends the preamble. In the following, the network device determining the RO on which the terminal device sends the preamble will be described in combination with FIG. 8 and FIG. 9.

Figure 8:
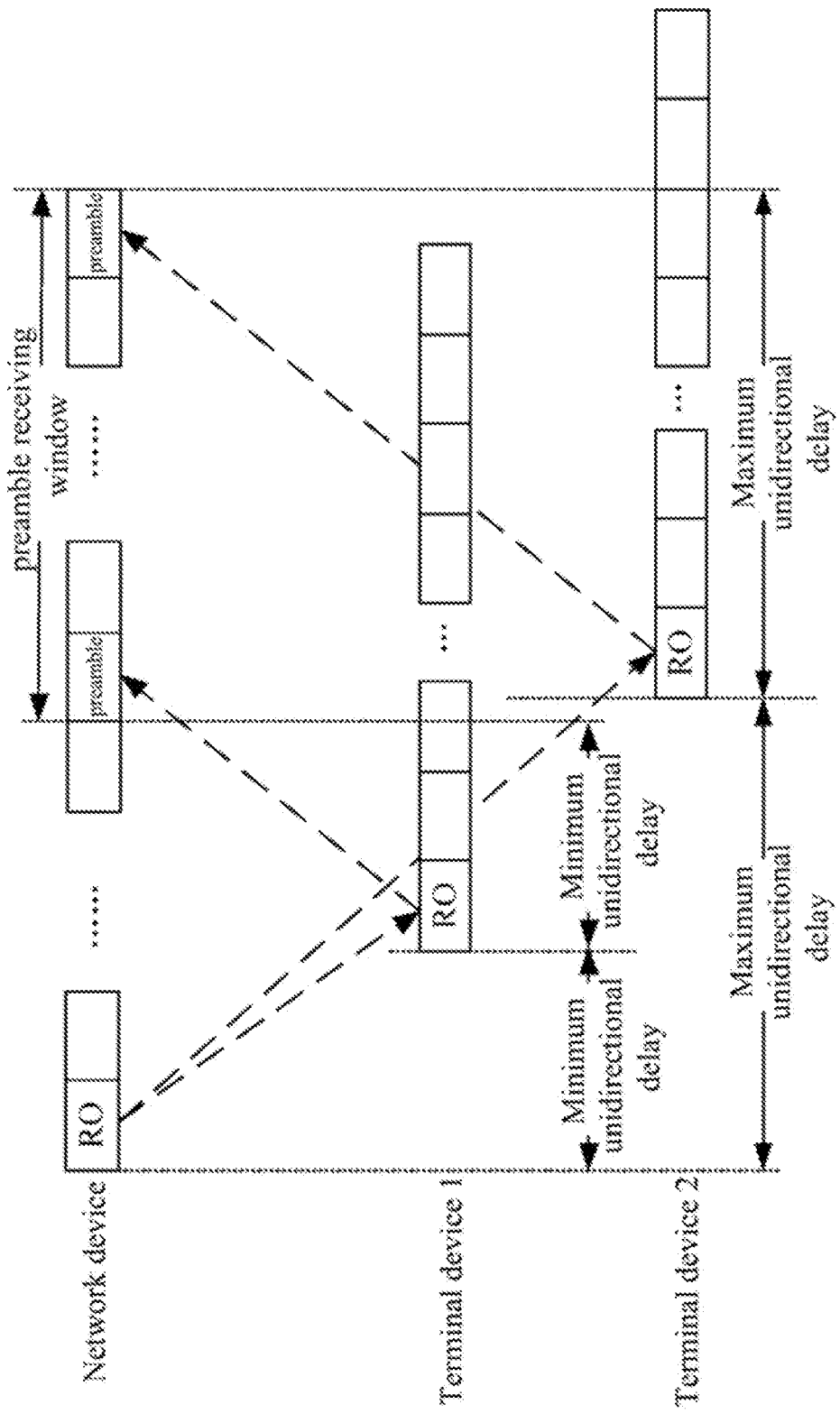
FIG. 8 is a schematic diagram of a receiving window provided by an embodiment of the present application.

FIG. 8 is a schematic diagram of a receiving window provided by an embodiment of the present application. Referring to FIG. 8, a network device may be a satellite in FIG. 1 or a base station in FIG. 2. Both a terminal device 1 and a terminal device 2 are located within the coverage of the network device. The terminal device 1 is closest to the network device, and the terminal device 2 is farthest from the network device.

In an NTN, a signal propagation delay between the terminal device and the satellite is long, and the coverage of the satellite is large. Therefore, within the coverage of the same satellite, when the location of the terminal device is different, there is also a large difference in the signal transmission delay between the terminal device and the satellite. For example, in an NTN cell (within the coverage of a satellite), a maximum difference of a signal transmission delay between different terminal devices and the network device (the satellite in FIG. 1 or the base station in FIG. 2) may be 10.3 ms. As a result, when the terminal devices in the same NTN cell use the same RACH resources to send preambles, the preambles reach the network device at different times. In order to enable the network device to receive the preambles sent by different terminal devices in the NTN cell, a length of a preamble receiving window of the network device should be set to 2*(maximum unidirectional delay−minimum unidirectional delay).

Figure 9:
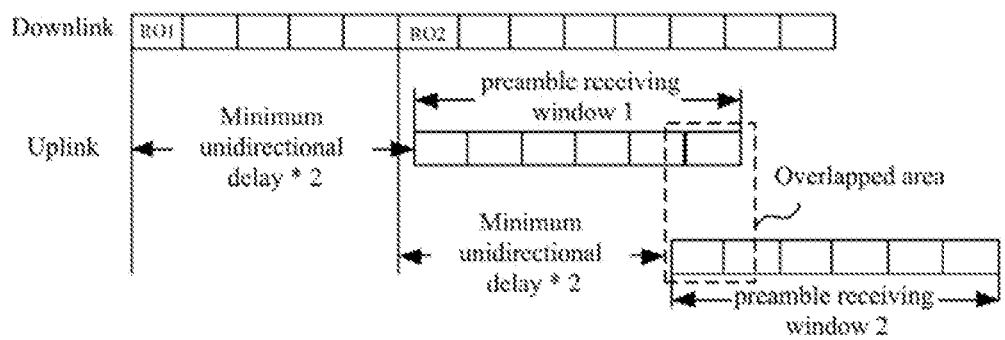
FIG. 9 is a schematic diagram of another receiving window provided by an embodiment of the present application.

FIG. 9 is a schematic diagram of another receiving window provided by an embodiment of the present application. Please refer to FIG. 9, when a preamble receiving window of a network device is long, if a time interval between adjacent ROs in the time domain is less than the length of the preamble receiving window, then the preamble receiving windows corresponding to ROs at different times will have an overlapped area in the time domain (the area shown in the dotted line box). In this way, after the network device receives a preamble in the overlapped area of multiple preamble receiving windows, it cannot know the RO on which the terminal device sends the preamble, and thus cannot determine an initial TA of the terminal device.

In related art, in order to avoid overlapped of multiple preamble receiving windows of the network device, when configuring RACH resources, the network device may set a time interval of adjacent ROs to be longer than the window length of the preamble receiving window, and in this way, the RACH capacity will be reduced.

In the present application, the network device configures RACH resources for a terminal device with positioning capability and a terminal device without positioning capability respectively, where, there are less time domain resources in the RACH resources configured for the terminal device without positioning capability, and more time domain resources in the RACH resources configured for the terminal device with positioning capability, and thus, different requirements of the two types of terminal devices for RACH resources are met, which not only makes the utilization of RACH resources higher, but also increases RACH capacity.

In the following, the technical solutions illustrated in the present application are described in detail through specific embodiments. It should be noted that the following embodiments may exist independently or be combined with each other. For the same or similar contents, the description will not be repeated in different embodiments.

Figure 10:
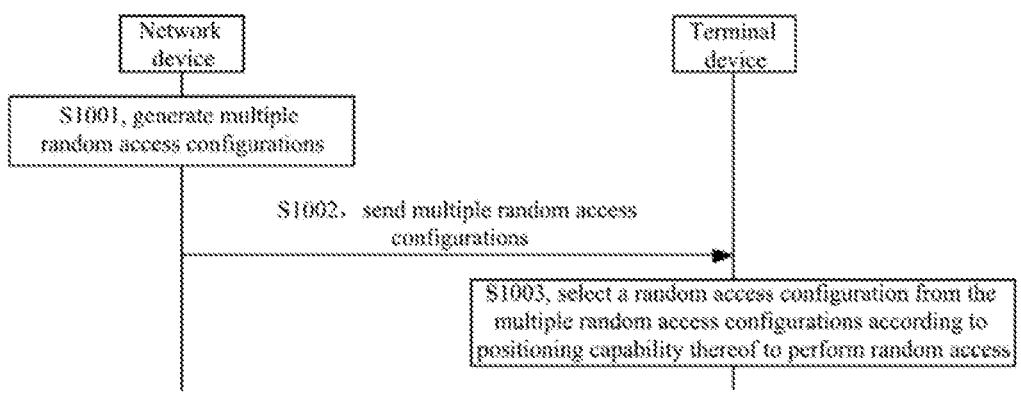
FIG. 10 is a schematic flowchart of a communication method provided by an embodiment of the present application.

FIG. 10 is a schematic flowchart of a communication method provided by an embodiment of the present application. Referring to FIG. 10, the method may include:

S1001, a network device generates multiple random access configurations.

Time domain resources indicated by the multiple random access configurations are different.

In an embodiment, the multiple random access configurations may include a first random access configuration and a second random access configuration, and time domain resources indicated by the first random access configuration are less than time domain resources indicated by the second random access configuration.

In the embodiment of the present application, the random access configuration may also be referred to as a RACH configuration. For example, a first random access configuration may be referred to as a first RACH configuration, and a second random access configuration may be referred to as a second RACH configuration.

It should be noted that, for the first random access configuration and the second random access configuration, reference may be made to the above description of the random access configuration, which will not be repeated here.

The first random access configuration includes a first frequency domain resource configuration or first indication information, and the second random access configuration includes a second frequency domain resource configuration or third indication information. In different cases, the contents included in the first random access configuration and the second random access configuration are different. The following cases may be included.

A first case: frequency domain resources indicated by the first random access configuration are the same as frequency domain resources indicated by the second random access configuration.

In this case, the contents included in the first random access configuration and the second random access configuration may be divided into the following cases:

Case 1, a first frequency domain resource configuration is included in the first random access configuration, and third indication information is included in the second random access configuration.

Since the frequency domain resources indicated by the first random access configuration are the same as the frequency domain resources indicated by the second random access configuration, the second frequency domain resource configuration is the same as the first frequency domain resource configuration. Since the third indication information indicates the second frequency domain resource configuration, the third indication information may indicate the first frequency domain resource configuration.

Accordingly, after the terminal device receives the first random access configuration and the second random access configuration, the terminal device may determine the first frequency domain resource configuration in the first random access configuration as the second frequency domain resource configuration in the second random access configuration according to the third indication information included in the second random access configuration.

Case 2, first indication information is included in the first random access configuration, and a second frequency domain resource configuration is included in the second random access configuration.

Since the frequency domain resources indicated by the first random access configuration are the same as the frequency domain resources indicated by the second random access configuration, the second frequency domain resource configuration is the same as the first frequency domain resource configuration. Since the first indication information indicates the first frequency domain resource configuration, the first indication information may indicate the second frequency domain resource configuration.

Accordingly, after the terminal device receives the first random access configuration and the second random access configuration, the terminal device may determine the second frequency domain resource configuration in the second random access configuration as the first frequency domain resource configuration in the first random access configuration according to the first indication information included in the first random access configuration.

Case 3: first indication information is included in the first random access configuration, and third indication information is included in the second random access configuration.

Frequency domain resource configurations indicated by the first indication information and the third indication information may be a preset frequency domain resource configuration, and the preset frequency domain resource configuration may be sent to the terminal device by the network device in advance, or may be predefined by a protocol, or may be preconfigured, etc.

Accordingly, after the terminal device receives the first random access configuration, the terminal device may determine the preset frequency domain resource configuration as the first frequency domain resource configuration in the first random access configuration according to the first indication information in the first random access configuration. After the terminal device receives the second random access configuration, the terminal device may determine the preset frequency domain resource configuration as the second frequency domain resource configuration in the second random access configuration according to the third indication information in the second random access configuration.

In the above cases 1-3, in the case that the frequency domain resources indicated by the first random access configuration are the same as the frequency domain resources indicated by the second random access configuration, the network device does not need to carry the frequency domain resource configuration in both the first random access configuration and the second random access configuration, which reduces the amount of information included in the first random access configuration and/or the second random access configuration, thereby reducing the signaling overhead.

Case 4: a first frequency domain resource configuration is included in the first random access configuration, and a second frequency domain resource configuration is included in the second random access configuration.

In the first case, the first random access configuration further includes:

a first time domain resource configuration; and a first random access preamble (hereinafter referred to as preamble) configuration or second indication information (indicating the first preamble configuration).

In the first case, the second random access configuration further includes: a second time domain resource configuration: and a second preamble configuration or fourth indication information (indicating the second preamble configuration).

It should be noted that in the first case, for whether the first random access configuration includes the first preamble configuration or the second indication information, and whether the second random access configuration includes the second preamble configuration or the fourth indication information, reference may be made to the following introduction, which will not be detailed here.

A second case: frequency domain resources indicated by the first random access configuration are different from frequency domain resources indicated by the second random access configuration.

In this case, a first frequency domain resource configuration is included in the first random access configuration, and a second frequency domain resource configuration is included in the second random access configuration.

A first preamble configuration or second indication information is included in the first random access configuration, and a second preamble configuration or fourth indication information is included in the second random access configuration. The contents included in the first random access configuration and the second random access configuration are different in different cases. The following cases may be included:

A first case: a preamble indicated by the first random access configuration is the same as a preamble indicated by the second random access configuration.

In this case, the contents included in the first random access configuration and the second random access configuration may be divided into the following cases:

Case 1: a first preamble configuration is included in the first random access configuration, and fourth indication information is included in the second random access configuration.

Since the preamble indicated by the first random access configuration is the same as the preamble indicated by the second random access configuration, the second preamble configuration is the same as the first preamble configuration. Since the fourth indication information indicates the second preamble configuration, the fourth indication information may indicate the first preamble configuration.

Accordingly, after the terminal device receives the first random access configuration and the second random access configuration, the terminal device may determine the first preamble configuration in the first random access configuration as the second preamble configuration in the second random access configuration according to the fourth indication information included in the second random access configuration.

Case 2, second indication information is included in the first random access configuration includes, and a second preamble configuration is included in the second random access configuration.

Since the preamble indicated by the first random access configuration is the same as the preamble indicated by the second random access configuration, the second preamble configuration is the same as the first preamble configuration. Since the second indication information indicates the first preamble configuration, the second indication information may indicate the second preamble configuration.

Accordingly, after the terminal device receives the first random access configuration and the second random access configuration, the terminal device may determine the second preamble configuration in the second random access configuration as the first preamble configuration in the first random access configuration according to the second indication information included in the first random access configuration.

Case 3: second indication information is included in the first random access configuration, and fourth indication information is included in the second random access configuration.

The preamble configurations indicated by the second indication information and the fourth indication information may be a preset preamble configuration, and the preset preamble configuration may be sent to the terminal device by the network device in advance, or may be predefined by a protocol, or may be preconfigured, etc.

Accordingly, after the terminal device receives the first random access configuration, the terminal device may determine the preset preamble configuration as the first preamble configuration in the first random access configuration according to the second indication information in the first random access configuration. After the terminal device receives the second random access configuration, the terminal device may determine the preset preamble configuration as the second preamble configuration in the second random access configuration according to the fourth indication information in the second random access configuration.

In the above cases 1-3, when the preamble indicated by the first random access configuration is the same as the preamble indicated by the second random access configuration, the network device does not need to carry the preamble configuration in both the first random access configuration and the second random access configuration, which reduces the amount of information included in the first random access configuration and/or the second random access configuration, thereby reducing the signaling overhead.

Case 4: a first preamble configuration is included in the first random access configuration, and a second preamble configuration is included in the second random access configuration.

In the first case, the first random access configuration further includes:

a first frequency domain resource configuration or first indication information (indicating the first frequency domain resource configuration); and a first time domain resource configuration.

In the first case, the second random access configuration further includes: a second frequency domain resource configuration or third indication information (indicating second frequency domain resource configuration); and a second time domain resource configuration.

It should be noted that, in the second case, for whether the first random access configuration includes the first frequency domain resource configuration or the first indication information, and whether the second random access configuration includes the second frequency domain resource configuration or the third indication information, reference may be made to the description in the following first case, which will not be detailed here.

A second case: a preamble indicated by the first random access configuration is different from a preamble indicated by the second random access configuration.

In this case, a first preamble configuration is included in the first random access configuration, and a second preamble configuration is included in the second random access configuration.

In an embodiment, time domain resources indicated by the first random access configuration are less than time domain resources indicated by the second random access configuration. For example, distribution density of the time domain resources indicated by the first random access configuration is smaller than distribution density of the time domain resources indicated by the second random access configuration; and/or, a quantity of time domain resources indicated by the first random access configuration is smaller than a quantity of time domain resources indicated by the second random access configuration.

S1002, the network device sends the multiple random access configurations to the terminal device.

In an embodiment, the network device may send the configuration information to the terminal device, and the configuration information includes the multiple random access configurations.

The network device may send the multiple random access configurations to the terminal device in a form of broadcast.

S1003, the terminal device selects a random access configuration from the multiple random access configurations according to positioning capability thereof to perform random access.

In an embodiment, when the terminal device does not have positioning capability, or the terminal device has positioning capability but fails in positioning, the terminal device may select a random access configuration indicating less time domain resources to perform random access. When the terminal device has positioning capability and succeeds in positioning, the terminal device may select a random access configuration indicating more time domain resources to perform random access.

Hereinafter, description is given by taking an example in which a first random access configuration and a second random access configuration are included in the multiple random access configurations, and the time domain resources indicated by the first random access configuration are less than the time domain resources indicated by the second random access configuration.

When the terminal device does not have positioning capability, the terminal device performs random access according to the first random access configuration, and when the terminal device has positioning capability, the terminal device performs random access according to the first random access configuration or the second random access configuration.

The terminal device performing random access according to the random access configuration (the first random access configuration or the second random access configuration) means: the terminal device performs random access according to resources indicated by the random access configuration, or the terminal device sends a message (or information) according to the resources indicated by the random access configuration in the random access process.

The terminal device performing random access according to the random access configuration (the first random access configuration or the second random access configuration) may be: the terminal device may select a resource from the resources indicated by the random access configuration and perform random access according to the selected resource. Or, the terminal device may determine a resource pool according to the random access configuration (the resource pool is resources indicated by the random access configuration), select a resource in the resource pool, and perform random access according to the selected resource.

When the terminal device has positioning capability, and the terminal device may succeed or fail in positioning in the process of performing random access. When the terminal device succeeds in positioning, the terminal device performs random access according to the resources indicated by the second random access configuration. When the terminal device fails in positioning, the terminal device performs random access according to the resources indicated by the first random access configuration.

In the time domain resources indicated by the first random access configuration, a time interval between two adjacent time domain resources is longer than or equal to a length of a RACH receiving window of the network device. In this way, in the process of performing random access by a terminal device without positioning capability, or when a terminal device with positioning capability fails in positioning in the random access process, the problem that the network device cannot determine the RO on which the terminal device sends the preamble caused by overlapped of preamble receiving windows corresponding to different ROs can be avoided, thereby avoiding the problem that the network device cannot determine an initial TA of the terminal device.

Since the time domain resources indicated by the second random access configuration are more than the time domain resources indicated by the first random access configuration, when the terminal device has positioning capability and the terminal device succeeds in positioning in the random access process, the terminal device can have more time domain resources to perform random access, which increases RACH capacity.

In the process of performing random access by the terminal device, depending on a different type of the terminal device (with or without positioning capability), the terminal device sends a first message (for example, a Msg1 in FIG. 3 or a MsgA in FIG. 4) based on a different TA. The following cases may be included:

A first case: the terminal device does not have positioning capability.

In this case, the terminal device receives a first TA sent by the network device, and the terminal device sends a first message to the network device according to the first TA.

A resource used by the terminal device to send the first message to the network device according to the first TA is a resource indicated by the first random access configuration.

A second case: the terminal device has positioning capability, and the terminal device fails in positioning.

In this case, the terminal device receives a second TA sent by the network device, and when the terminal device fails in positioning, the terminal device sends the first message to the network device according to the second TA.

A resource used by the terminal device to send the first message to the network device according to the second TA is a resource indicated by the first random access configuration.

A third case: the terminal device has positioning capability, and the terminal device succeeds in positioning.

In this case, when the terminal device succeeds in positioning, the terminal device determines a third TA and sends the first message to the network device according to the third TA.

A resource used by the terminal device to send the first message to the network device according to the third TA is a resource indicated by the second random access configuration.

According to the communication method provided in the embodiment of the present application, the network device generates and sends multiple random access configurations to the terminal device, and the terminal device may select a random access configuration from the multiple random access configurations to perform random access according to positioning capability thereof. For a terminal device without positioning capability, or a terminal device with positioning capability but failing in positioning, a random access configuration information indicating less time domain resources may be selected to perform random access, to avoid the problem that the network device cannot determine the initial TA of the terminal device. For a terminal device with positioning capability and succeeding in positioning, a random access configuration indicating more time domain resources may be selected to perform random access, so that the terminal device can have more time domain resources to perform random access and RACH capacity is increased.

On the basis of any one of the above embodiments, hereinafter the first random access configuration and the second random access configuration are illustrated.

A first case:

there is no same preamble existing in a first preamble group and a second preamble group.

The first preamble group is a preamble group indicated by the first preamble configuration. The second preamble group is a preamble group indicated by the second preamble configuration. The first preamble group includes at least one preamble, and the second preamble group includes at least one preamble.

In an embodiment, when a root sequence (e.g., a preamble root sequence) is included in a preamble configuration (the first preamble configuration or the second preamble configuration), the terminal device determines the preamble group according to the root sequence. Or, the network device may determine the preamble group according to the root sequence, and accordingly, the preamble group is included in the preamble configuration.

The terminal device or network device may determine the first preamble group and the second preamble group through at least the following two feasible implementation manners:

A first manner:

obtaining the first preamble group by performing cyclic shift on a first root sequence; and obtaining the second preamble group by performing cyclic shift on a second root sequence.

The first root sequence may be a first preamble root sequence, and the second root sequence may be a second preamble root sequence.

In this manner, since the first preamble group and the second preamble group are obtained by performing cyclic shift on different root sequences, there is no same preamble existing in the first preamble group and the second preamble group.

A second manner:

obtaining a preamble set by performing cyclic shift on a third root sequence, and determining a first part of preambles in the preamble set as the first preamble group, and determining a second part of preambles in the preamble set as the second preamble group.

The third root sequence may be a third preamble root sequence.

In this manner, since the first preamble group and the second preamble group are different parts of the preamble set, there is no same preamble existing in the first preamble group and the second preamble group. The first preamble group and the second preamble group can be obtained by performing cyclic shift on a same root sequence, so that the complexity of determining the first preamble group and the second preamble group is relatively low.

In the first case, the first time domain resource configuration is different from the second time domain resource configuration. In an embodiment, the time domain resources indicated by the first time domain resource configuration partially overlap with the time domain resources indicated by the second time domain resource configuration, so that the utilization of time domain resources can be made higher. Of course, the time domain resources indicated by the first time domain resource configuration may also not overlap with the time domain resources indicated by the second time domain resource configuration at all.

In the first case, the first frequency domain resource configuration and the second frequency domain resource configuration may be the same or different.

When the first frequency domain resource configuration and the second frequency domain resource configuration are different, the frequency domain resources indicated by the first frequency domain resource configuration and the frequency domain resources indicated by the second frequency domain resource configuration may partially overlap or may not overlap.

When the first frequency domain resource configuration and the second frequency domain resource configuration are the same, the frequency domain resources indicated by the first frequency domain resource configuration and the frequency domain resources indicated by the second frequency domain resource configuration completely overlap.

When the frequency domain resources indicated by the first frequency domain resource configuration partially or completely overlap with the frequency domain resources indicated by the second frequency domain resource configuration, the utilization of the frequency domain resources can be made higher.

In the following, the time-frequency resources (time domain resources and frequency domain resources) in the first case will be described in combination with FIG. 11. The resources indicated by the first random access configuration is a first resource pool, and the resources indicated by the second random access configuration is a second resource pool.

Figure 11:
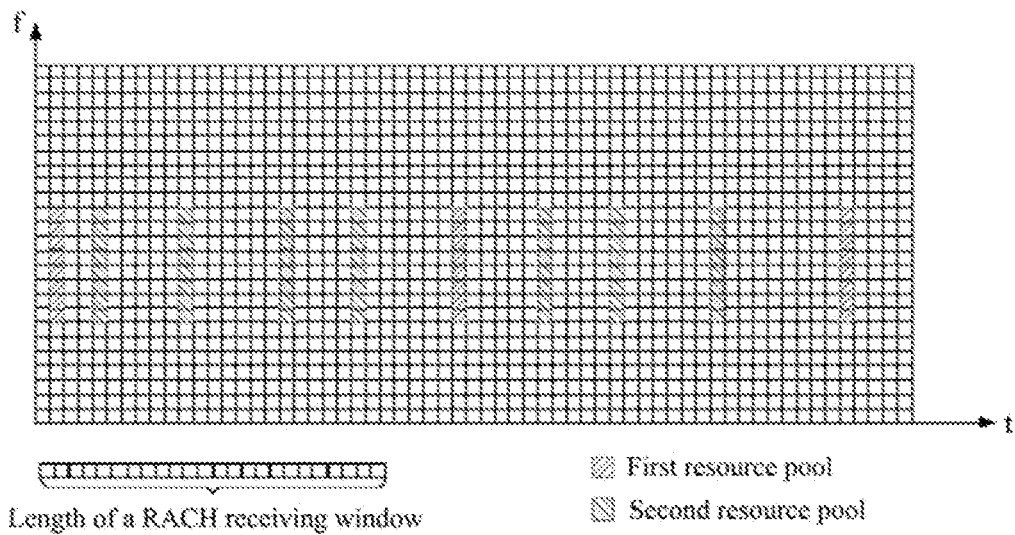
FIG. 11 is a schematic diagram of a type of time-frequency resources provided by an embodiment of the present application.

FIG. 11 is a schematic diagram of a type of time-frequency resources provided by an embodiment of the present application. Referring to FIG. 1I, the frequency domain resources in the first resource pool are the same as the frequency domain resources in the second resource pool. The time domain resources in the first resource pool are less than the time domain resources in the second resource pool. There is no same preamble existing in the preamble of the first resource pool and the preamble of the second resource pool (not illustrated in the figure). Since there is no same preamble existing in the preamble of the first resource pool and the preamble of the second resource pool, the network device may distinguish a terminal device according to a preamble after receiving the preamble, so that the network device can determine an initial TA of the terminal device. Since the frequency domain resources in the first resource pool are the same as the frequency domain resources in the second resource pool, the utilization of frequency domain resources is made higher.

It should be noted that FIG. 11 only illustrates the resources in the first resource pool and the second resource pool in the form of an example. Of course, the resources in the first resource pool and the second resource pool may also be others. For example, the frequency domain resources in the first resource pool may partially overlap with the frequency domain resources in the second resource pool, or the frequency domain resources in the first resource pool may not overlap with the frequency domain resources in the second resource pool.

A second case:

the frequency domain resources indicated by the first frequency domain resource configuration do not overlap with the frequency domain resources indicated by the second frequency domain resource configuration.

Since the frequency domain resources indicated by the first frequency domain resource configuration do not overlap with the frequency domain resources indicated by the second frequency domain resource configuration, the first frequency domain resource configuration is different from the second frequency domain resource configuration.

In the second case, the first time domain resource configuration is different from the second time domain resource configuration. In an embodiment, the time domain resources indicated by the first time domain resource configuration may partially overlap with the time domain resources indicated by the second time domain resource configuration, so that the utilization of time domain resources can be made higher. Of course, the time domain resources indicated by the first time domain resource configuration may also not overlap with the time domain resources indicated by the second time domain resource configuration at all.

In the second case, the first preamble configuration and the second preamble configuration may be the same or different.

When the first preamble configuration and the second preamble configuration are different, the preambles in the first preamble group indicated by the first preamble configuration and the second preamble group indicated by the second preamble configuration may be partially the same, and there may also be no overlapped preamble in the first preamble group and the second preamble group.

When the first preamble configuration and the second preamble configuration are the same, the first preamble group indicated by the first preamble configuration and the second preamble group indicated by the second preamble configuration have exactly the same preamble.

When there is a same preamble existing in the first preamble group indicated by the first preamble configuration and the second preamble group indicated by the second preamble configuration, or the preambles are exactly the same, the utilization of preambles can be made higher.

Next, the time-frequency resources (time domain resources and frequency domain resources) in the second case will be described in combination with FIG. 12, where the resources indicated by the first random access configu-
ration are the first resource pool, and the resources indicated by the second random access configuration are the second resource pool.

Figure 12:
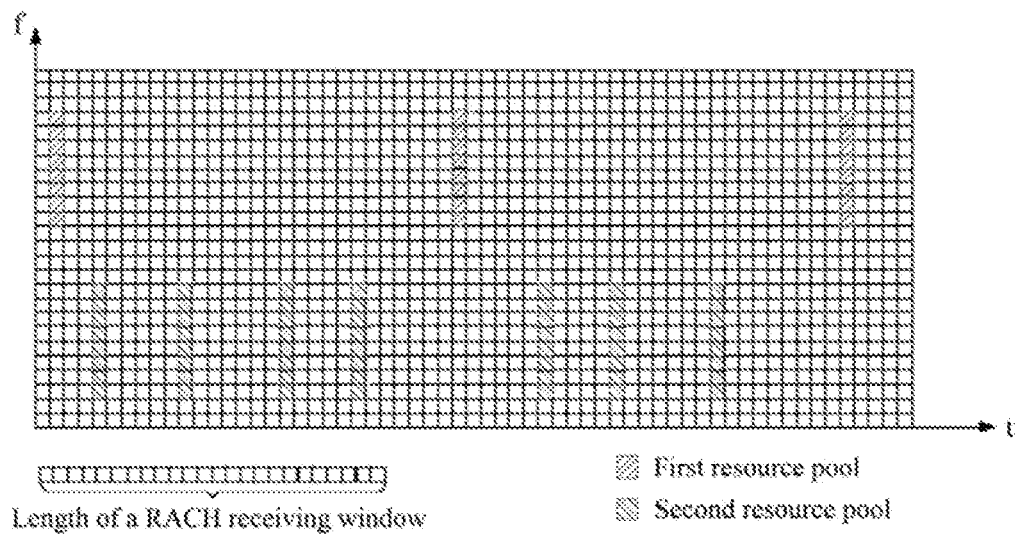
FIG. 12 is a schematic diagram of another type of time-frequency resources provided by an embodiment of the present application.

FIG. 12 is a schematic diagram of another type of time-frequency resources provided by an embodiment of the present application. Referring to FIG. 12, there is no overlap between frequency domain resources in the first resource pool and frequency domain resources in the second resource pool. Time domain resources in the first resource pool are less than time domain resources in the second resource pool. Since there is no overlap between the frequency domain resources in the first resource pool and the frequency domain resources in the second resource pool, a network device may distinguish a terminal device according to a frequency domain resource used by the terminal device to send a preamble after receiving the preamble, so that the network device can determine an initial TA of the terminal device. There is a same preamble existing in the preamble in the first resource pool and the preamble in the second resource pool, or the preamble in the first resource pool and the preamble in the second resource pool may be exactly the same, which can make the utilization of the preamble higher.

Of course, there may also be no same preamble existing in the preamble in the first resource pool and the preamble in the second resource pool.

A third case:

the frequency domain resources indicated by the first frequency domain resource configuration partially overlap with the frequency domain resources indicated by the second frequency domain resource configuration. The preambles in the first preamble group indicated by the first preamble configuration and the second preamble group indicated by the second preamble configuration are partially the same.

Since the frequency domain resources indicated by the first frequency domain resource configuration partially overlap with the frequency domain resources indicated by the second frequency domain resource configuration, the first frequency domain resource configuration is different from the second frequency domain resource configuration.

Since the preambles in the first preamble group and the second preamble group are partially same, the first preamble configuration is different from the second preamble configuration.

In the third case, the first time domain resource configuration is different from the second time domain resource configuration. In an embodiment, the time domain resources indicated by the first time domain resource configuration partially overlap with the time domain resources indicated by the second time domain resource configuration, so that the utilization rate of time domain resources can be made higher. Of course, the time domain resources indicated by the first time domain resource configuration may also not overlap with the time domain resources indicated by the second time domain resource configuration at all.

Next, the time-frequency resources (time domain resources and frequency domain resources) in the third case will be described in combination with FIG. 13, where the resources indicated by the first random access configuration are the first resource pool, and the resources indicated by the second random access configuration are the second resource pool.

Figure 13:
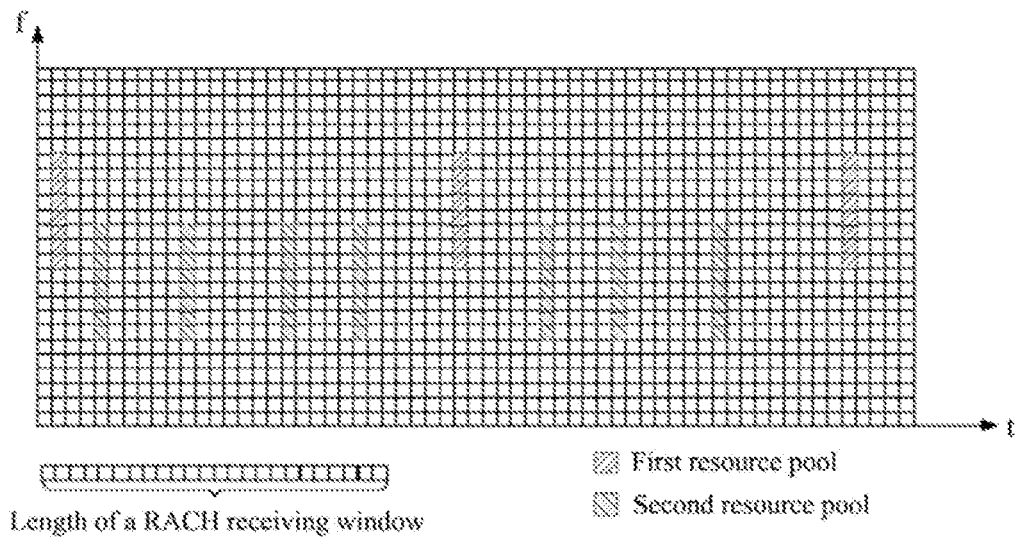
FIG. 13 is a schematic diagram of still another type of time-frequency resources provided by an embodiment of the present application.

FIG. 13 is a schematic diagram of still another type of time-frequency resources provided by an embodiment of the present application. Referring to FIG. 13, the frequency domain resources in the first resource pool partially overlap with the frequency domain resources in the second resource pool. The time domain resources in the first resource pool are less than the time domain resources in the second resource pool. The preambles in the first resource pool and the second resource pool are partially the same (not illustrated in the figure).

Since the frequency domain resources in the first resource pool partially overlap with the frequency domain resources in the second resource pool, and the time domain resources in the first resource pool are less than the time domain resources in the second resource pool, after the network device receives the preamble sent by the terminal device, the network device may distinguish a terminal device according to a non-overlapped frequency domain resource in the first resource pool and the second resource pool, or the network device may distinguish a terminal device according to a non-overlapped preamble in the first resource pool and the second resource pool, and then determine an initial TA of the terminal device.

Next, the use of the resources shown in FIG. 13 by the terminal device will be described.

When the terminal device performs random access according to the first random access configuration, the resources used by the terminal device may include the following two cases:

Case 1, the frequency domain resource used by the terminal device to perform random access is: an overlapped frequency domain resource between frequency domain resources indicated by the first frequency domain resource configuration (the frequency domain resources in the first resource pool) and frequency domain resources indicated by the second frequency domain resource configuration (the frequency domain resources in the second resource pool); and a preamble used by the terminal device to perform random access (also called a preamble sent by the terminal device) is in the first preamble group and not in the second preamble group.

For ease of description, the resources indicated by the first random access configuration are called the first resource pool, and the resources indicated by the second random access configuration are called the second resource pool. A frequency domain resource which is overlapped between the first resource pool and second resource pool is called an overlapped frequency domain resource, and a preamble which is overlapped between the first resource pool and second resource pool is called an overlapped preamble.

In this case, since the preamble used by the terminal device is a non-overlapped preamble in the first preamble group (a preamble except the overlapped preamble), after the network device receives the preamble sent by the terminal device, the network device may distinguish the terminal device according to the preamble, and then determine an initial TA of the terminal device. The frequency domain resource used by terminal devices is an overlapped frequency domain resource in the first resource pool. In this way, the non-overlapped frequency domain resources in the first resource pool (frequency domain resources except overlapped frequency domain resources in the first resource pool) may be reserved for terminal devices using an overlapped preamble, which improves resource utilization.

Of course, if the preamble used by terminal devices is a non-overlapped preamble in the first preamble group, the frequency domain resource used by the terminal device to perform random access may also be a non-overlapped frequency domain resource in the first resource pool. The embodiment of the present application does not impose specific limitation on this.

Case 2, the frequency domain resource used by the terminal device to perform random access is: a frequency domain resource except overlapped frequency domain resources (also known as non-overlapped frequency domain resource) in the frequency domain resources indicated by the first frequency domain resources; where, the overlapped frequency domain resources are: resources overlapped between frequency domain resources indicated by the first frequency domain resource configuration and frequency domain resources indicated by the second frequency domain resource configuration; and the random access preamble used by the terminal device to perform random access is in the first random access preamble group and in the second random access preamble group.

In this case, since the frequency domain resource used by the terminal device in the random access process is a non-overlapped frequency domain resource in the first resource pool (a frequency domain resource except the overlapped frequency domain resource in the first resource pool), after the network device receives the preamble sent by the terminal device, the network devices may distinguish the terminal device according to the frequency domain resource used by terminal device to send the preamble, and then determine an initial TA of the terminal devices. The preamble sent by the terminal device is an overlapped preamble in the first resource pool (or the first preamble group). Thereby, the non-overlapped preamble (the preamble except the overlapped preamble) in the first resource pool may be reserved for the terminal device using an overlapped frequency domain resource, which makes the utilization of resources higher.

Of course, when the frequency domain resource used by the terminal device to perform random access is a non-overlapped frequency domain resource in the first resource pool, the terminal device may also use a non-overlapped preamble in the first resource pool. The present application embodiment does not impose specific limitation on this.

When the terminal device performs random access according to the second random access configuration, resources used by the terminal device may include the following cases:

Case 1, the frequency domain resource used by the terminal device to perform random access is: an overlapped frequency domain resource between the frequency domain resources indicated by the first frequency domain resource configuration and the frequency domain resources indicated by the second frequency domain resource configuration; the preamble used by terminal device to perform random access is in the second preamble group and not in the first preamble group.

In this case, since the preamble used by the terminal device is a non-overlapped preamble in the second preamble group (a preamble except the overlapped preamble), after the network device receives the preamble sent by the terminal device, the network devices may distinguish the terminal device according to the preamble, and then determine an initial TA of the terminal device. The frequency domain resource used by terminal device is an overlapped frequency domain resource in the second resource pool. Thereby, the non-overlapped frequency domain resource in the second resource pool (the frequency domain resource except the overlapped frequency domain resources in the second resource pool) can be reserved for a terminal device using an overlapped preamble, which makes the utilization of resources higher.

Of course, when the preamble used by the terminal device is a non-overlapped preamble in the second preamble group, the frequency domain resource used by terminal device to perform random access may also be a non-overlapped frequency domain resource in the second resource pool. The embodiment of the present application does not impose specific limitation on this.

Case 2, the frequency domain resource used by the terminal device to perform random access is: a frequency domain resource, except the overlapped frequency domain resource, in the frequency domain resources indicated by the second frequency domain resource configuration; where the overlapped frequency domain resource is: an resource which is overlapped between the frequency domain resources indicated by the first frequency domain resource configuration and the frequency domain resources indicated by the second frequency domain resource configuration; the random access preamble used by the terminal device is in the first random access preamble group and in the second random access preamble group.

In this case, the frequency domain resource used by the terminal device in the random access process is a non-overlapped frequency domain resource in the second resource pool (a frequency domain resource except the overlapped frequency domain resource in the second resource pool). Therefore, after the network device receives the preamble sent by the terminal device, the network device may distinguish the terminal device according to the frequency domain resource used by terminal device to send the preamble, and then determine an initial TA of the terminal devices. The preamble sent by the terminal device is an overlapped preamble in the second resource pool (or the second preamble group). In this way, the non-overlapped preamble (a preamble except the overlapped preamble) in the second resource pool may be reserved for a terminal device using an overlapped frequency domain resource, which makes the utilization of resources higher.

Of course, when the frequency domain resource used by the terminal device to perform random access is a non-overlapped frequency domain resource in the second resource pool, the terminal device may also use a non-overlapped preamble in the second resource pool. The embodiment of the present application does not impose specific limitation on this.

Figure 14:
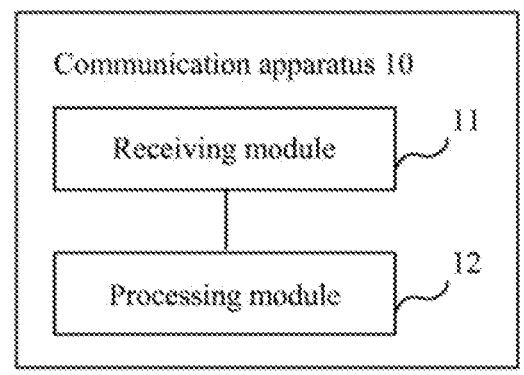
FIG. 14 is a schematic structural diagram of a communication apparatus provided by an embodiment of the present application.

FIG. 14 is a schematic structural diagram of a communication apparatus provided by an embodiment of the present application. The communication apparat 10 may be set on a terminal device. Please referring to FIG. 14, the communication apparatus 10 may include a receiving module 11 and a processing module 12, where the receiving module 11 is configured to acquire multiple random access configurations of a network device, where the multiple random access configurations indicate different time domain resources; and the processing module 12 is configured to select, according to positioning capability thereof, a random access configuration from the multiple random access configurations to perform random access.

The communication apparatus provided by the embodiment of the present application can implement the technical solutions illustrated in the above method embodiments, and the implementation principle and beneficial effect are similar, which will not be described here.

In a possible implementation, the multiple random access configurations include a first random access configuration and a second random access configuration, and time domain resources indicated by the first random access configuration are less than time domain resources indicated by the second random access configuration; and the processing module is specifically configured to:

when the terminal device does not have positioning capability, perform random access according to the first random access configuration; and when the terminal device has positioning capability, perform random access according to the first random access configuration or the second random access configuration.

In a possible implementation, in the time domain resources indicated by the first random access configuration, a time interval between two adjacent time domain resources is longer than or equal to a length of a random access channel RACH receiving window of the network device.

In a possible implementation, the first random access configuration includes the following information:

a first frequency domain resource configuration, or first indication information indicating the first frequency domain resource configuration;

a first time domain resource configuration; and a first random access preamble configuration, or second indicating information indicating the first random access preamble configuration.

In a possible implementation, the second random access configuration includes the following information:

a second frequency domain resource configuration, or third indication information indicating the second frequency domain resource configuration;

a second time domain resource configuration; and a second random access preamble configuration, or fourth indication information indicating the second random access preamble configuration.

In a possible implementation, the first time domain resource configuration is different from the second time domain resource configuration.

In a possible implementation, the time domain resources indicated by the first time domain resource configuration partially overlap with the time domain resources indicated by the second time domain resource configuration.

In a possible implementation, no same random access preamble exists in a first random access preamble group indicated by the first random access preamble configuration and a random access preamble group indicated by the second random access preamble configuration; and where, the first random access preamble group includes at least one random access preamble, and the second random access preamble group includes at least one random access preamble.

In a possible implementation, the random access preamble in the first random access preamble group is a random access preamble obtained by performing cyclic shift on a first root sequence; and the random access preamble in the second random access preamble group is a random access preamble obtained by performing cyclic shift on a second root sequence.

In a possible implementation, the random access preamble in the first random access preamble group is: a first part of a random access preamble set; and the random access preamble in the second random access preamble group is: a second part of the random access preamble set; and where random access preambles in the random access preamble set are random access preambles obtained by performing cyclic shift on a third root sequence.

In a possible implementation, frequency domain resources indicated by the first frequency domain resource configuration do not overlap with frequency domain resources indicated by the second frequency domain resource configuration.

In a possible implementation, frequency domain resources indicated by the first frequency domain resource configuration partially overlap with frequency domain resources indicated by the second frequency domain resource configuration; and random access preambles in a first random access preamble group indicated by the first random access preamble configuration and a second random access preamble group indicated by the second random access preamble configuration are partially the same.

In a possible implementation, the terminal device performs random access according to the first random access configuration:

a frequency domain resource used by the terminal device to perform random access is: an overlapped frequency domain resource between the frequency domain resources indicated by the first frequency domain resource configuration and the frequency domain resources indicated by the second frequency domain resource configuration; and a random access preamble used by the terminal device to perform random access is in the first random access preamble group, and not in the second random access preamble group.

In a possible implementation, the terminal device performs random access according to the first random access configuration;

a frequency domain resource used by the terminal device to perform random access is: a frequency domain resource, except an overlapped frequency domain resource, in the frequency domain resources indicated by the first frequency domain resource configuration; where, the overlapped frequency domain resource is: an overlapped resource between the frequency domain resources indicated by the first frequency domain resource configuration and the frequency domain resources indicated by the second frequency domain resource configuration; and a random access preamble used by the terminal device to perform random access is in the first random access preamble group, and in the second random access preamble group.

In a possible implementation, the terminal device performs random access according to the second random access configuration;

a frequency domain resource used by the terminal device to perform random access is: an overlapped frequency domain resource between the frequency domain resources indicated by the first frequency domain resource configuration and the frequency domain resources indicated by the second frequency domain resource configuration; and a random access preamble used by the terminal device to perform random access is in the second random access preamble group, and not in the first random access preamble group.

In a possible implementation, the terminal device performs random access according to the second random access configuration;

a frequency domain resource used by the terminal device to perform random access is: a frequency domain resource, except an overlapped frequency domain resource, in the frequency domain resources indicated by the second frequency domain resources; where the overlapped frequency domain resource is: an overlapped resource between the frequency domain resources indicated by the first frequency domain resource configuration and the frequency domain resources indicated by the second frequency domain resource configuration; and a random access preamble used by the terminal device to perform random access is in the first random access preamble group, and in the second random access preamble group.

In a possible implementation, the processing module 12 is specifically configured to:

when the terminal device succeeds in positioning, perform random access according to the second random access configuration; and when the terminal device fails in positioning, perform random access according to the first random access configuration.

In a possible implementation, distribution density of the time domain resources indicated by the first random access configuration is small than distribution density of the time domain resources indicated by the second random access configuration; and/or, a quantity of the time domain resources indicated by the first random access configuration is less than a quantity of the time domain resources indicated by the second random access configuration.

Figure 15:
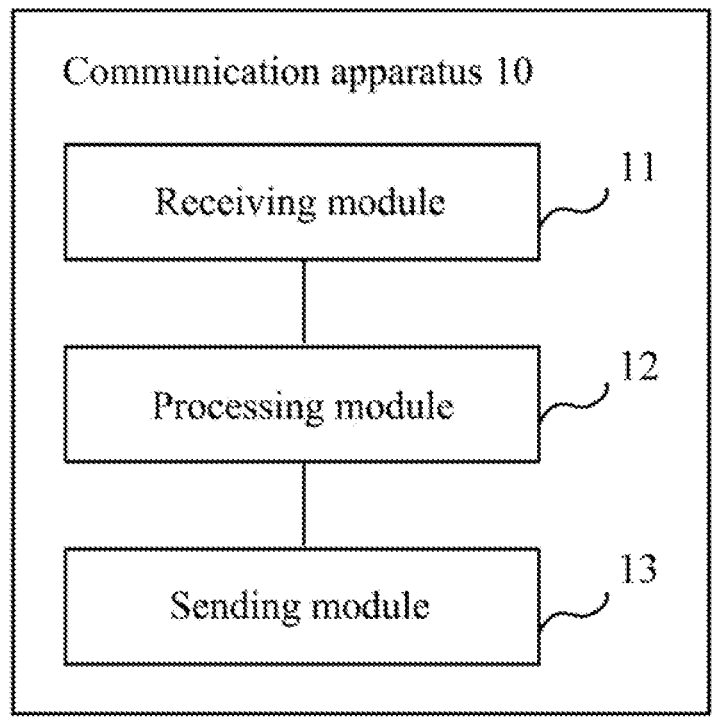
FIG. 15 is a schematic structural diagram of another communication apparatus provided by an embodiment of the present application.

FIG. 15 is a schematic structural diagram of another communication apparatus provided by an embodiment of the present application. On the basis of the embodiment shown in FIG. 14, please refer to FIG. 15, the apparatus further includes a sending module 13, where, when the terminal device does not have positioning capability, the receiving module 11 is further configured to receive a first time advance TA sent by the network device; and the sending module 13 is configured to send a first message to the network device according to the first TA.

In a possible implementation, when the terminal device has positioning capability, the receiving module 11 is further configured to receive a second TA sent by the network device; and the sending module 13 is configured to send a first message to the network device according to the second TA when the terminal device fails in positioning.

In a possible implementation, when the terminal device has positioning capability, the processing module 12 is further configured to determine a third TA when the terminal device succeeds in positioning; and the sending module 13 is configured to send a first message to the network device according to the third TA.

The communication apparatus provided by the embodiment of the present application can implement the technical solutions illustrated in the above method embodiments, and its implementation principle and beneficial effect are similar, which will not be described here.

Figure 16:
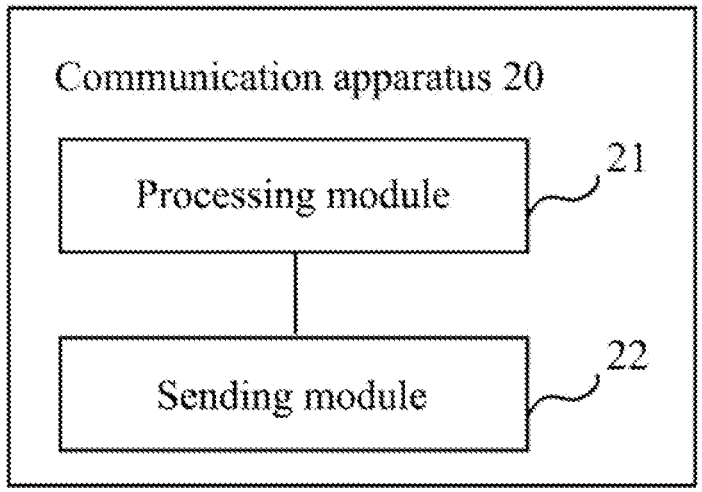
FIG. 16 is a schematic structural diagram of still another communication apparatus provided by an embodiment of the present application.

FIG. 16 is a schematic structural diagram of still another communication apparatus provided by an embodiment of the present application. The communication apparatus 20 may be applied to a network device. Please refer to FIG. 16. The communication apparatus 20 includes a processing module 21 and a sending module 22, where, the processing module 21 is configured to generate multiple random access configurations, where the multiple random access configurations indicate different time domain resources; and the sending module 22 is configured to send the multiple random access configurations to a terminal device, where the multiple random access configurations are used for terminal devices with different positioning capability to perform random access.

The communication apparatus provided by the embodiment of the present application can implement the technical solutions described in the above method embodiments, and its implementation principle and beneficial effect are similar, which will not be described here.

In a possible implementation, the multiple random access configurations include a first random access configuration and a second random access configuration, and time domain resources indicated by the first random access configuration are less than time domain resources indicated by the second random access configuration;

where the first random access configuration is used for a terminal device without positioning capability or a terminal device with positioning capability to perform random access, and the second random access configuration is used for a terminal device without positioning capability to perform random access.

In a possible implementation, in the time domain resources indicated by the first random access configuration, a time interval between two adjacent time domain resources is longer than or equal to a length of a random access channel RACH receiving window of the network device.

In a possible implementation, the first random access configuration includes the following information:

a first frequency domain resource configuration, or first indication information indicating the first frequency domain resource configuration;

a first time domain resource configuration; and a first random access preamble configuration, or second indicating information indicating the first random access preamble configuration.

In a possible implementation, the second random access configuration includes the following information:

a second frequency domain resource configuration, or third indication information indicating the second frequency domain resource configuration;

a second time domain resource configuration; and a second random access preamble configuration, or fourth indication information indicating the second random access preamble configuration.

In a possible implementation, the first time domain resource configuration is different from the second time domain resource configuration.

In a possible implementation, the time domain resources indicated by the first time domain resource configuration partially overlap with the time domain resources indicated by the second time domain resource configuration.

In a possible implementation, no same random access preamble exists in a first random access preamble group indicated by the first random access preamble configuration and a second random access preamble group indicated by the second random access preamble configuration; and where, the first random access preamble group includes at least one random access preamble, and the second random access preamble group includes at least one random access preamble.

In a possible implementation, the random access preamble in the first random access preamble group is a random access preamble obtained by performing cyclic shift on a first root sequence; and the random access preamble in the second random access preamble group is a random access preamble obtained by performing cyclic shift on a second root sequence.

In a possible implementation, the random access preamble in the first random access preamble group is: a first part of the random access preamble set;

the random access preamble in the second random access preamble group is: a second part of the random access preamble set; and where random access preambles in the random access preamble set are random access preambles obtained by performing cyclic shift on a third root sequence.

In a possible implementation, frequency domain resources indicated by the first frequency domain resource configuration do not overlap with frequency domain resources indicated by the second frequency domain resource configuration.

In a possible implementation, frequency domain resources indicated by the first frequency domain resource configuration partially overlap with frequency domain resources indicated by the second frequency domain resource configuration; and random access preambles in a first random access preamble group indicated by the first random access preamble configuration and a second random access preamble group indicated by the second random access preamble configuration are partially the same.

In a possible implementation, distribution density of the time domain resources indicated by the first random access configuration is smaller than distribution density of the time domain resources indicated by the second random access configuration; and/or, a quantity of the time domain resources indicated by the first random access configuration is less than a quantity of the time domain resources indicated by the second random access configuration.

The communication apparatus provided by the embodiment of the present application can implement the technical solution described in the above method embodiment, and its implementation principle and beneficial effect are similar, which will not be repeated here.

Figure 17:
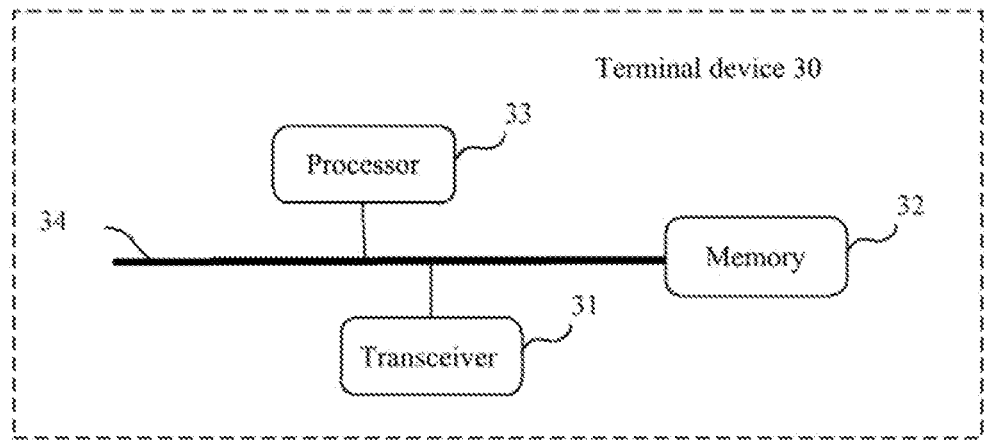
FIG. 17 is a schematic structural diagram of a terminal device provided by an embodiment of the present application.

FIG. 17 is a schematic structural diagram of the terminal device provided in an embodiment of the present application. Referring to FIG. 17, a terminal device 30 may include a transceiver 31, a memory 32 and a processor 33. The transceiver 31 may include: a transmitter and/or a receiver. The transmitter may also be referred to as a sender, a transmitting device, a transmitting port or a transmitting interface, etc., and the receiver may also be referred to as a receiver, a receiving device, a receiving port or a receiving interface, etc. Illustratively, the transceiver 31, the memory 32, and the processor 33 are connected to each other via a bus 34.

The memory 32 is configured to store program instructions;

the processor 33 is configured to execute the program instructions stored in the memory to cause the terminal device 30 to execute any one of the communication methods described above.

The receiver of the transceiver 31 may be configured to execute the receiving function of the terminal device in the communication method described above. The transmitter of the transceiver 31 may be configured to execute the sending function of the terminal device in the communication method described above.

Figure 18:
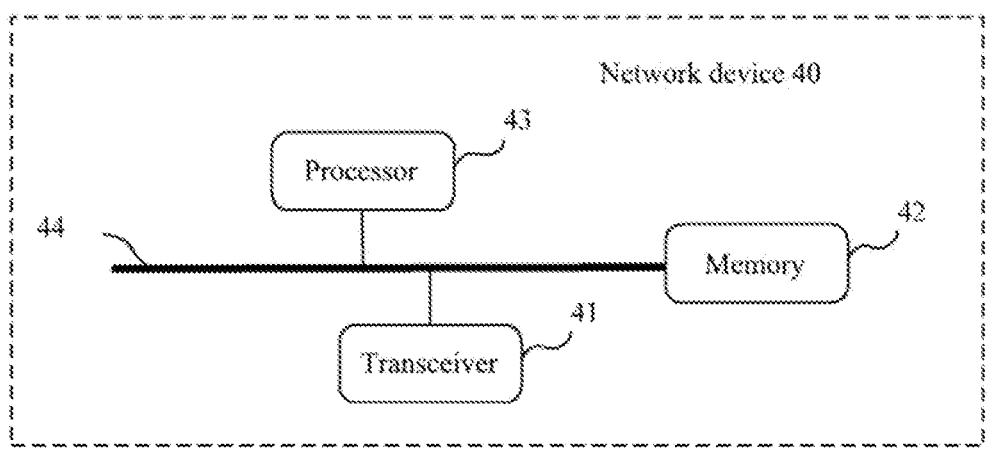
FIG. 18 is a schematic structural diagram of a network device provided by an embodiment of the present application.

FIG. 18 is a schematic structural diagram of a network device provided in an embodiment of the present application. Referring to FIG. 18, a network device 40 may include a transceiver 41, a memory 42 and a processor 43. The transceiver 41 may include: a transmitter and/or a receiver.

The transmitter may also be referred to as a sender, a transmitting device, a transmitting port or a transmitting interface, etc., and the receiver may also be referred to as a receiver, a receiving device, a receiving port or a receiving interface, etc. Illustratively, the transceiver 41, the memory 42, and the processor 43 are connected to each other via a bus 44.

The memory 42 is configured to store program instructions:

the processor 43 is configured to execute the program instructions stored in the memory to cause the network device 40 to execute any one of the communication methods described above.

The transmitter of the transceiver 41 may be configured to execute the sending function of the network device in the above communication method.

An embodiment of the present application provides a computer readable storage medium, and the computer readable storage medium stores computer-executable instructions, and the computer executable-instructions, when executed by a processor, are used to implement the above communication method.

An embodiment of the present application may also provide a computer program product, and the computer program product can be executed by a processor, and when the computer program product is executed, any of the above communication methods performed by the terminal device can be implemented.

The terminal device, computer readable storage medium and computer program product of the embodiments of the present application can execute the above communication method of the terminal device and for the specific implementation process and beneficial effect thereof, reference may be made to the above description, which will not be described here.

All or part of the steps to implement embodiments of each of the above methods may be accomplished by a program instructing relevant hardware. The foregoing program may be stored in a readable memory. When the program is executed, the steps including the above method embodiments are executed; and the aforementioned memory (storage medium) includes: a read-only memory (English: read-only memory. Abbreviation: ROM), a read-only memory (RAM), a flash memory, a hard disk, a solid state disk, a magnetic tape (English: magnetic tape), a floppy disk (English: floppy disk), a CD-ROM (English: optical disc) and any combination thereof.)

Embodiments of the present application are described with reference to flow charts and/or block diagrams of the method, device (system), and computer program product according to the embodiments of the present application. It should be understand that each flow and/or block in a flow chart and/or block diagram and the combination of the flow and/or block in the flow chart and/or block diagram may be implemented by computer program instructions. These computer program instructions may be provided to a processing unit of a general purpose computer, a special purpose computer, an embedded processor or other programmable data processing devices to produce a machine, which causes an apparatus for implementing a specified function in one or more processes in a flowchart and/or one or multiple blocks in a block diagram to be generated by instructions executed by the processing unit of a computer or other programmable data processing devices.

These computer program instructions may also be stored in a computer readable memory capable of booting the computer or other programmable data processing devices to operate in a particular way, so that the instructions stored in the computer readable memory generate a manufacture product including an instruction apparatus, and the specified functions in one or more flows in a flowchart and/or one or more blocks in a block diagram are implemented by the instruction apparatus.

These computer program instructions may also be loaded onto a computer or other programmable data processing devices to cause a series of operation steps to be executed on the computer or other programmable devices to generate computer-implemented processing, thereby instructions executed on the computer or other programmable devices provide steps for implementing a function specified in one or more processes in a flowchart and/or one or more blocks in a block diagram.

Obviously, the technical personnel in the art may make various changes and variations of the embodiments of the present application without deviating from the spirit and scope of the present application. Thus, if such modifications and variations of the embodiments of the present application fall within the scope of claims of the present application and their equivalent technologies, then such modifications and variations are intended to be included in the present application as well.

In the present application, the term "including" and its variations may mean non-restrictive inclusions; and the term "or" and its variations may mean "and/or". The terms "first", "second", etc. in the present application are used to distinguish similar objects and are not necessarily used to describe a specific order or sequence. In the present application, "multiple" means two or more. "And/or" describes the association relationship of associated objects, indicating that there are three relationships. For example, A and/or B, may mean: A exists alone, A and B exist at the same time, and B exists alone. A character "/" generally indicates that the associated objects before and after are in an "or" relationship.

What is claimed is:

1. A communication method, comprising:
    acquiring, by a terminal device, multiple random access configurations of a network device, wherein the multiple random access configurations indicate different time domain resources; and
    selecting, by the terminal device, according to positioning capability thereof, a random access configuration from the multiple random access configurations to perform random access;
    wherein the multiple random access configurations comprise a first random access configuration and a second random access configuration, and time domain resources indicated by the first random access configuration are less than time domain resources indicated by the second random access configuration; and the selecting, by the terminal device, according to the positioning capability thereof, the random access configuration from the multiple random access configurations to perform random access comprises:
        performing, by the terminal device, random access according to the first random access configuration, when the terminal device does not have positioning capability; and
        performing, by the terminal device, random access according to the first random access configuration or the second random access configuration, when the terminal device has positioning capability;
    wherein the first random access configuration comprises following information:

a first frequency domain resource configuration, or first indication information indicating the first frequency domain resource configuration;
a first time domain resource configuration; and
a first random access preamble configuration, or second indication information indicating the first random access preamble configuration;
wherein the second random access configuration comprises following information:
a second frequency domain resource configuration, or third indication information indicating the second frequency domain resource configuration;
a second time domain resource configuration; and
a second random access preamble configuration, or fourth indication information indicating the second random access preamble configuration;
wherein,
frequency domain resources indicated by the first frequency domain resource configuration partially overlap with frequency domain resources indicated by the second frequency domain resource configuration; and
random access preambles of a first random access preamble group indicated by the first random access preamble configuration and a second random access preamble group indicated by the second random access preamble configuration are partially the same.

2. The method according to claim 1, wherein,
in the time domain resources indicated by the first random access configuration, a time interval between two adjacent time domain resources is longer than or equal to a length of a random access channel (RACH) receiving window of the network device.

3. The method according to claim 1, wherein the first time domain resource configuration is different from the second time domain resource configuration.

4. The method according to claim 3, wherein the time domain resources indicated by the first time domain resource configuration partially overlap with the time domain resources indicated by the second time domain resource configuration.

5. The method according to claim 1, wherein no same random access preamble exists in a first random access preamble group indicated by the first random access preamble configuration and a second random access preamble group indicated by the second random access preamble configuration; and wherein,
the first random access preamble group comprises at least one random access preamble, and the second random access preamble group comprises at least one random access preamble.

6. The method according to claim 5, wherein,
the random access preamble in the first random access preamble group is a random access preamble obtained by performing cyclic shift on a first root sequence; and
the random access preamble in the second random access preamble group is a random access preamble obtained by performing cyclic shift on a second root sequence.

7. The method according to claim 5, wherein,
the random access preamble in the first random access preamble group is: a first part of a random access preamble set; and
the random access preamble in the second random access preamble group is: a second part of the random access preamble set; and
wherein, random access preambles in the random access preamble set are random access preambles obtained by performing cyclic shift on a third root sequence.

8. The method according to claim 1, wherein the terminal device performs random access according to the first random access configuration;
a frequency domain resource used by the terminal device to perform random access is: an overlapped frequency domain resource between the frequency domain resources indicated by the first frequency domain resource configuration and the frequency domain resources indicated by the second frequency domain resource configuration; and
a random access preamble used by the terminal device to perform random access is in the first random access preamble group, and not in the second random access preamble group.

9. The method according to claim 1, wherein the terminal device performs random access according to the first random access configuration;
a frequency domain resource used by the terminal device to perform random access is: a frequency domain resource, except an overlapped frequency domain resource, in the frequency domain resources indicated by the first frequency domain resources;
wherein, the overlapped frequency domain resource is: an overlapped resource between the frequency domain resources indicated by the first frequency domain resource configuration and the frequency domain resources indicated by the second frequency domain resource configuration; and
a random access preamble used by the terminal device to perform random access is in the first random access preamble group, and in the second random access preamble group.

10. The method according to claim 1, wherein the terminal device performs random access according to the second random access configuration;
a frequency domain resource used by the terminal device to perform random access is: an overlapped frequency domain resource between the frequency domain resources indicated by the first frequency domain resource configuration and the frequency domain resources indicated by the second frequency domain resource configuration; and
a random access preamble used by the terminal device to perform random access is in the second random access preamble group, and not in the first random access preamble group.

11. The method according to claim 1, wherein the terminal device performs random access according to the second random access configuration;
a frequency domain resource used by the terminal device to perform random access is: a frequency domain resource, except an overlapped frequency domain resource, in the frequency domain resources indicated by the second frequency domain resources; wherein, the overlapped frequency domain resource is: an overlapped resource between the frequency domain resources indicated by the first frequency domain resource configuration and the frequency domain resources indicated by the second frequency domain resource configuration; and
a random access preamble used by the terminal device to perform random access is in the first random access preamble group, and in the second random access preamble group.

12. The method according to claim 1, wherein the selecting, by the terminal device, according to positioning capability thereof, the random access configuration from the multiple random access configurations to perform random access comprises:
- performing, by the terminal device, random access according to the second random access configuration, when the terminal device succeeds in positioning; and
- performing, by the terminal device, random access according to the first random access configuration, when the terminal device fails in positioning.

13. The method according to claim 1, wherein,
distribution density of the time domain resources indicated by the first random access configuration is smaller than distribution density of the time domain resources indicated by the second random access configuration; and/or,
a quantity of the time domain resources indicated by the first random access configuration is less than a quantity of the time domain resources indicated by the second random access configuration.

14. The method according to claim 1, wherein the terminal device does not have positioning capability; and the method further comprises:
- receiving, by the terminal device, a first timing advance TA sent by the network device; and
- sending, by the terminal device, a first message to the network device according to the first TA.

15. The method according to claim 1,
wherein the terminal device has positioning capability; and the method further comprises:
- receiving, by the terminal device, a second timing advance TA sent by the network device; and
- sending, by the terminal device, a first message to the network device according to the second TA when the terminal device fails in positioning;

or,
wherein the terminal device has positioning capability; and the method further comprises:
- determining, by the terminal device, a third timing advance TA when the terminal device succeeds in positioning; and
- sending, by the terminal device, a first message to the network device according to the third TA.

16. A non-transitory computer readable storage medium, wherein the computer readable storage medium has computer-executable instructions stored therein, and the computer executable-instructions, when executed by a processor, are used to implement the communication method according to claim 1.

17. A communication method, comprising:
- generating, by a network device, multiple random access configurations, wherein the multiple random access configurations indicate different time domain resources; and
- sending, by the network device, the multiple random access configurations to a terminal device, wherein the multiple random access configurations are used for terminal devices with different positioning capability to perform random access;
- wherein the multiple random access configurations comprise a first random access configuration and a second random access configuration, and time domain resources indicated by the first random access configuration are less than time domain resources indicated by the second random access configuration; and
- wherein, the first random access configuration is used for a terminal device without positioning capability or a terminal device with positioning capability to perform random access, and the second random access configuration is used for a terminal device with positioning capability to perform random access;
- wherein the first random access configuration comprises following information:
  - a first frequency domain resource configuration, or first indication information indicating the first frequency domain resource configuration;
  - a first time domain resource configuration; and
  - a first random access preamble configuration, or second indication information indicating the first random access preamble configuration;
- wherein the second random access configuration comprises following information:
  - a second frequency domain resource configuration, or third indication information indicating the second frequency domain resource configuration;
  - a second time domain resource configuration; and
  - second random access preamble configuration, or fourth indication information indicating the second random access preamble configuration;
- wherein,
- frequency domain resources indicated by the first frequency domain resource configuration partially overlap with frequency domain resources indicated by the second frequency domain resource configuration; and
- random access preambles of a first random access preamble group indicated by the first random access preamble configuration and a second random access preamble group indicated by the second random access preamble configuration are partially the same.

18. A terminal device, comprising:
a transceiver, a processor, a memory; wherein,
the memory stores computer-executable instructions; and
the processor executes the computer-executable instructions stored in the memory to cause the processor to:
- acquire multiple random access configurations of a network device, wherein the multiple random access configurations indicate different time domain resources; and
- select, according to positioning capability thereof, a random access configuration from the multiple random access configurations to perform random access;
wherein the multiple random access configurations comprise a first random access configuration and a second random access configuration, and time domain resources indicated by the first random access configuration are less than time domain resources indicated by the second random access configuration; and the processor is configured to:
- perform random access according to the first random access configuration, when the terminal device does not have positioning capability; and
- perform random access according to the first random access configuration or the second random access configuration, when the terminal device has positioning capability;
wherein the first random access configuration comprises following information:
- a first frequency domain resource configuration, or first indication information indicating the first frequency domain resource configuration;
- a first time domain resource configuration; and
- a first random access preamble configuration, or second indication information indicating the first random access preamble configuration;

wherein the second random access configuration comprises following information:
- a second frequency domain resource configuration, or third indication information indicating the second frequency domain resource configuration;
- a second time domain resource configuration; and
- a second random access preamble configuration, or fourth indication information indicating the second random access preamble configuration;

wherein, frequency domain resources indicated by the first frequency domain resource configuration partially overlap with frequency domain resources indicated by the second frequency domain resource configuration; and random access preambles of a first random access preamble group indicated by the first random access preamble configuration and a second random access preamble group indicated by the second random access preamble configuration are partially the same.

19. A network device, comprising:
a transceiver, a processor, a memory; wherein,
the memory stores computer-executable instructions; and
the processor executes computer-executable instructions stored in the memory to cause the processor to perform the communication method according to claim 5.

20. A non-transitory computer readable storage medium, wherein the computer readable storage medium has computer-executable instructions stored therein, and the computer executable-instructions, when executed by a processor, are used to implement the communication method according to claim 5.

* * * * *